(12) United States Patent
Tsironis

(10) Patent No.: US 11,816,416 B1
(45) Date of Patent: Nov. 14, 2023

(54) EXPERIMENTAL VERIFICATION AND OPTIMIZATION OF TWO-STAGE AMPLIFIER

(71) Applicant: Christos Tsironis, Dollard-des-Ormeaux (CA)

(72) Inventor: Christos Tsironis, Kirkland (CA)

(*) Notice: Subject to any disclaimer, the term of this patent is extended or adjusted under 35 U.S.C. 154(b) by 436 days.

(21) Appl. No.: 17/178,693

(22) Filed: Feb. 18, 2021

(51) Int. Cl.
| | |
|---|---|
| *G06F 9/455* | (2018.01) |
| *G06F 30/398* | (2020.01) |
| *H03F 3/19* | (2006.01) |
| *H03F 1/56* | (2006.01) |
| *G06F 119/06* | (2020.01) |

(52) U.S. Cl.
CPC ............ *G06F 30/398* (2020.01); *H03F 1/56* (2013.01); *H03F 3/19* (2013.01); *G06F 2119/06* (2020.01); *H03F 2200/451* (2013.01)

(58) Field of Classification Search
USPC .................................................. 716/133, 136
See application file for complete search history.

(56) References Cited

U.S. PATENT DOCUMENTS

| | | | |
|---|---|---|---|
| 6,297,649 B1 * | 10/2001 | Tsironis .................. | H01P 1/212 333/248 |
| 6,674,293 B1 | 1/2004 | Tsironis | |
| 7,816,926 B2 | 10/2010 | Benedikt et al. | |
| 8,456,175 B2 | 6/2013 | Marchetti et al. | |
| 8,497,689 B1 | 7/2013 | Tsironis | |
| 9,310,410 B1 * | 4/2016 | Tsironis ................. | G01R 27/28 |
| 9,625,556 B1 | 4/2017 | Tsironis | |
| 10,281,510 B1 * | 5/2019 | Tsironis ............. | G01R 31/2822 |
| 11,137,439 B1 * | 10/2021 | Tsironis ............... | G01R 35/005 |
| 11,193,966 B1 * | 12/2021 | Tsironis ..................... | H01P 5/04 |
| 2013/0234741 A1 * | 9/2013 | Mow ....................... | H01Q 5/328 324/750.01 |
| 2016/0050010 A1 * | 2/2016 | Buehler ................ | H04B 7/1851 455/73 |
| 2018/0048796 A1 * | 2/2018 | Hsu ......................... | G03B 17/14 |
| 2018/0262163 A1 * | 9/2018 | Tokuda ..................... | G05F 3/26 |
| 2018/0262166 A1 * | 9/2018 | Takagi .................... | H03F 3/245 |

OTHER PUBLICATIONS

Load Pull, [online], Wikipedia [Retrieved on Nov. 18, 2016] Retrieved from Internet <URL:http://en.wikipedia.org/wiki/Load_pull>.

(Continued)

*Primary Examiner* — Brian Ngo

(57) ABSTRACT

A experimental matching network optimization method for two-stage power amplifiers combines existing technologies such as: Impedance tuners for load pull measurements, computers for RF network synthesis and analysis and numerical optimization algorithms, to create a method for in-situ experimentally verifying and optimizing the effect of matching network designs on overall amplifier performance before their manufacturing. The method eliminates guess-work in amplifier design, especially with regards to the interstage matching network of two-stage RF amplifiers. When properly implemented, the method revolutionizes MMIC amplifier design, by augmenting design confidence and bypassing costly hardware iterations.

13 Claims, 13 Drawing Sheets

(56) References Cited

OTHER PUBLICATIONS

"Computer Controlled Microwave Tuner-CCMT," Product Note 41, Focus Microwaves Inc., Jan. 1998.
A New Load-pull Characterization Method for Microwave Power Transistors, Y. Takayama, [online], 1976 IEEE Microwave Theory & Techniques Society (MTT-S) International Microwave Symposium, pp. 218-220. [Retrieved on Apr. 6, 2017]. Retrieved from Internet <URL:http://ieeexplore.ieee.org/document/1 123701/>.
Focus Compact Modeling [online], Brochure, Focus Microwaves [Retrieved on Mar. 13, 2019], Retrieved from Internet <URL: https://focus- microwaves.com/focus- compact-modelling/>.
"WinPADS, a Power Amplifier Design Software using Load Pull Contours", Product Note 56, Focus-Microwaves Inc. May 1999.
"Load Pull Measurements on Very low Impedance Transistors", Application Note 06, Focus Microwaves, Inc. Nov. 1993.
"MPT, a universal Multi-Purpose Tuner", Product Note 79, Focus Microwaves Inc. Oct. 2004.
"Transfer matrices", Princeton University, p. 5, equations (1.13) and (1.14).
"EEsof EDA Advanced System Designs" Brochure 5988-3326EN, Keysight Technologies, Jul. 2017.

\* cited by examiner

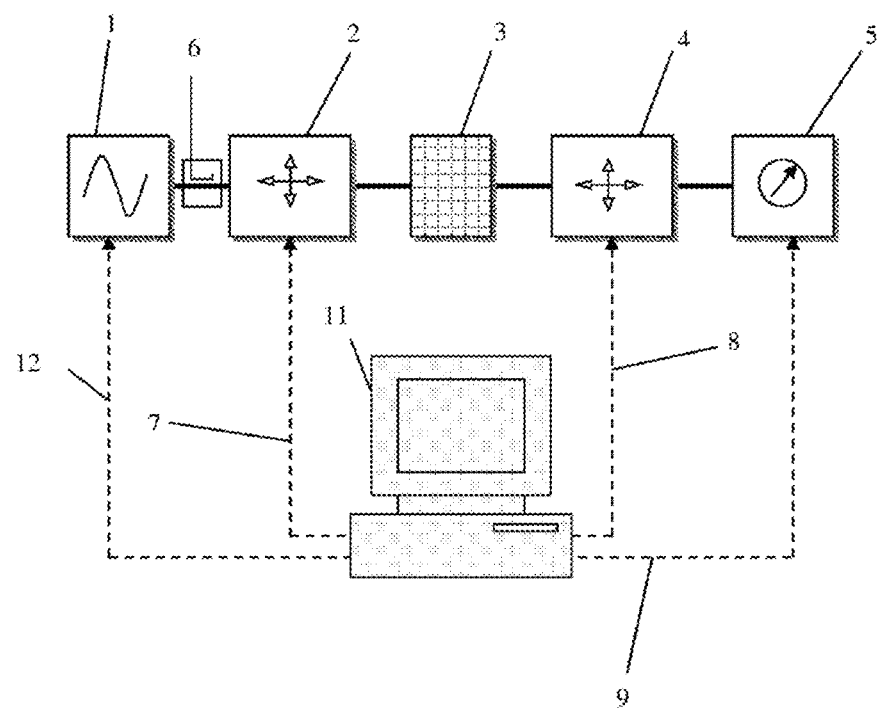
FIG. 1: Prior art

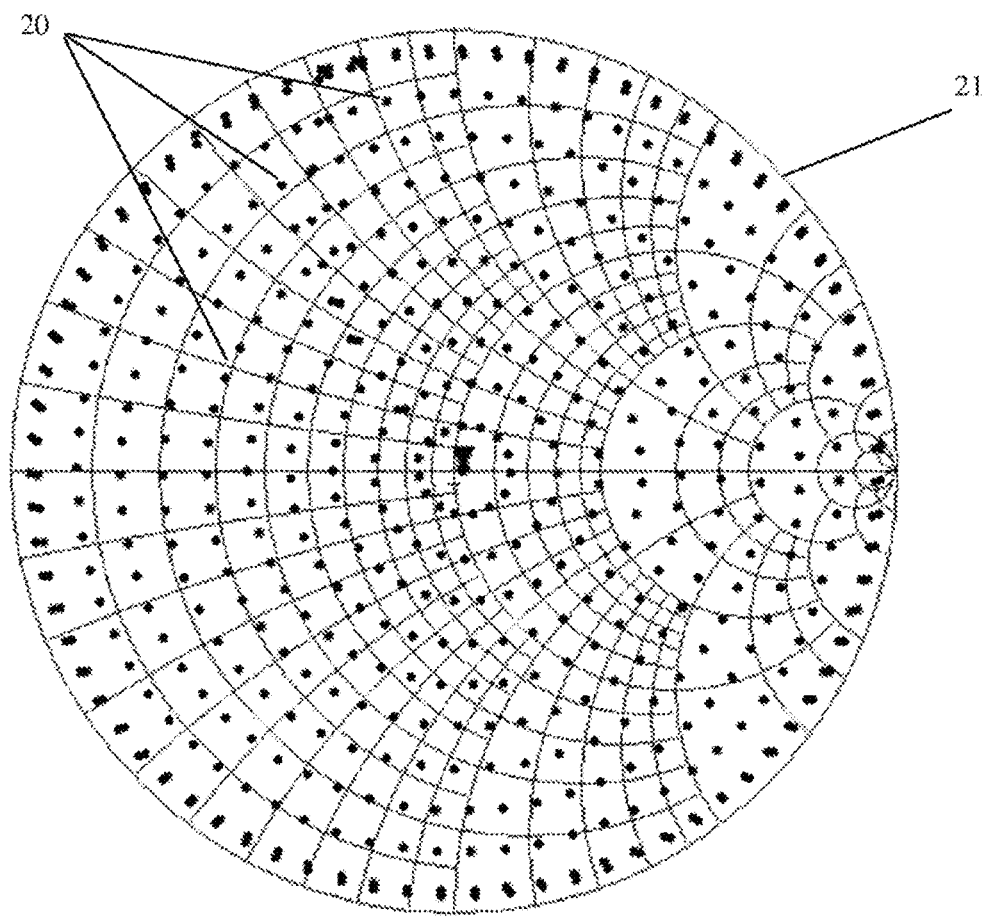
FIG. 2: Prior art

FIG. 3A
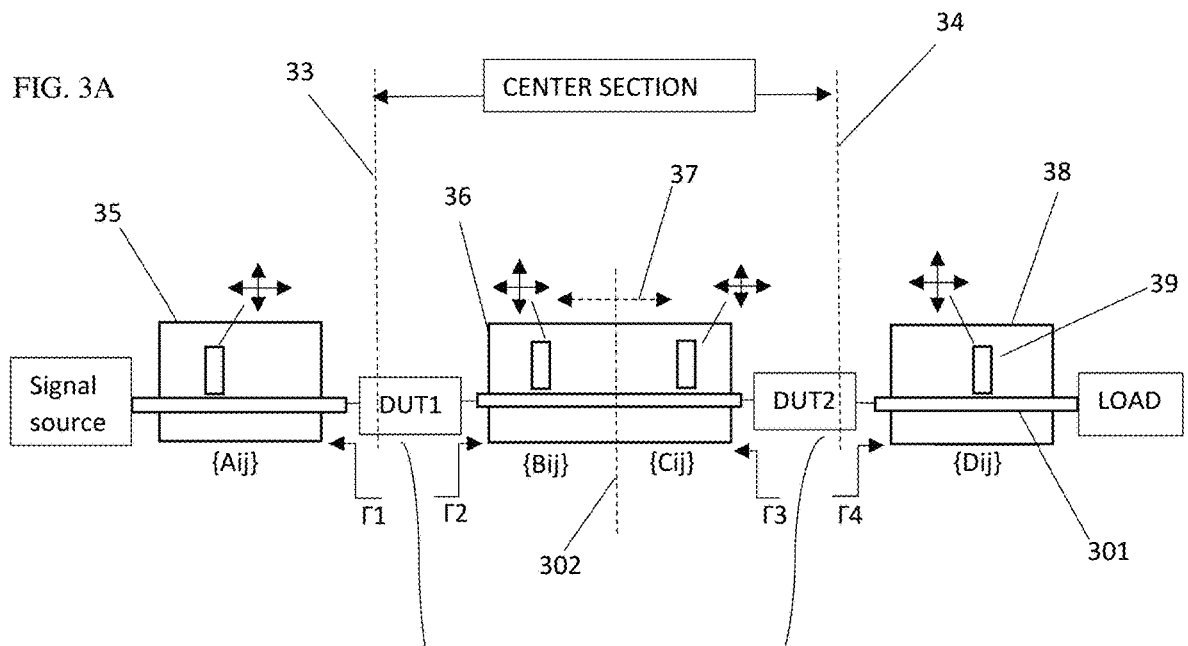
FIG. 3B: Prior art
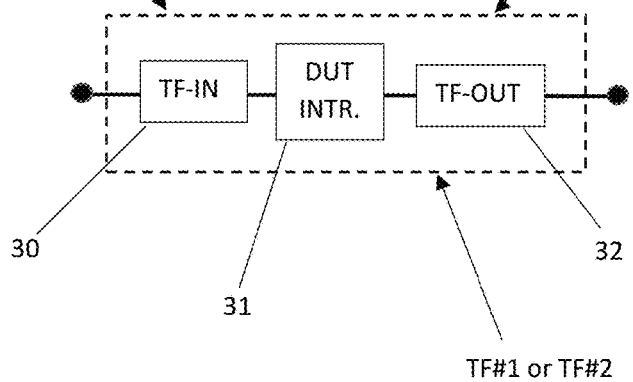
TF#1 or TF#2

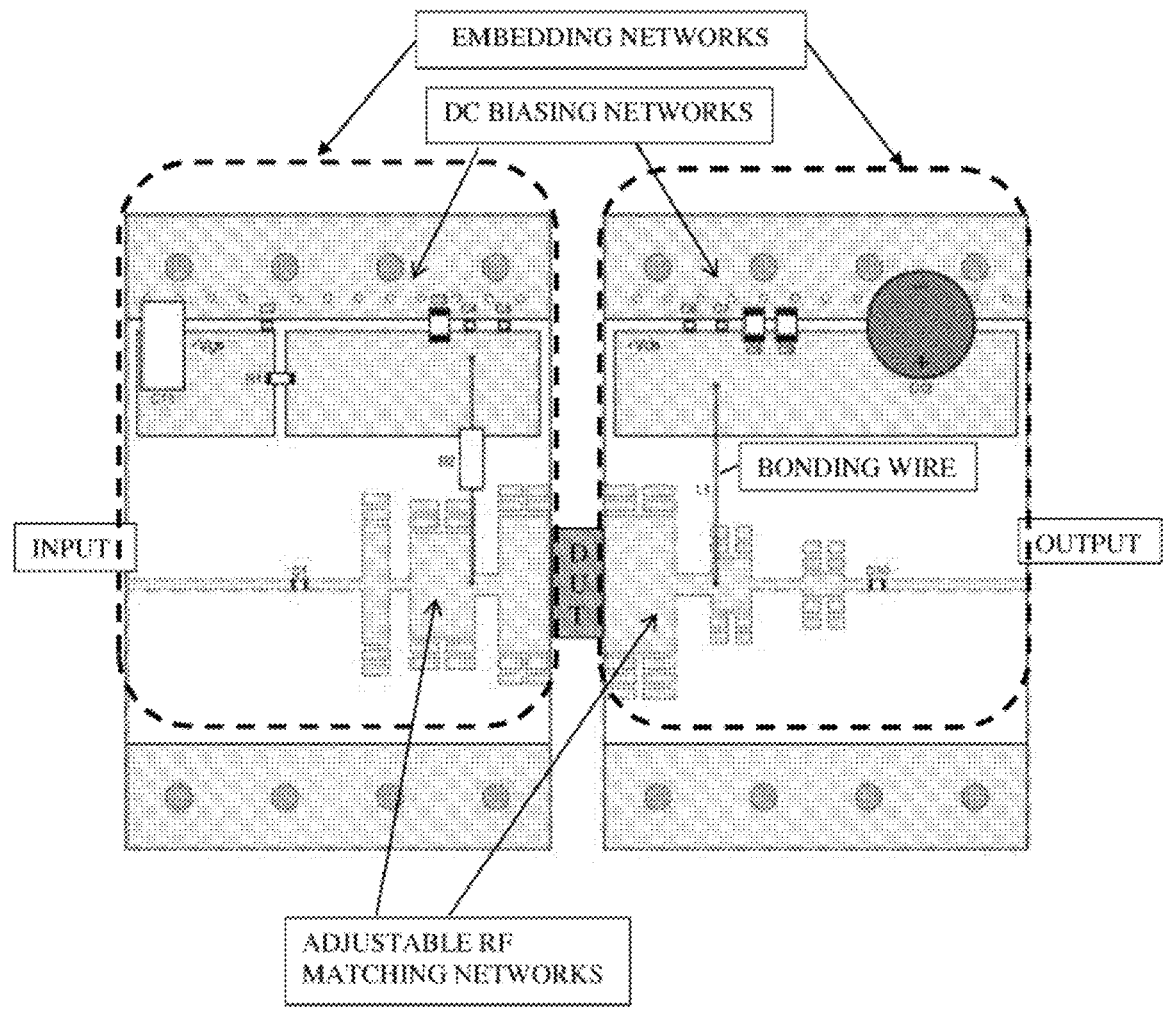
FIG. 5: Prior art

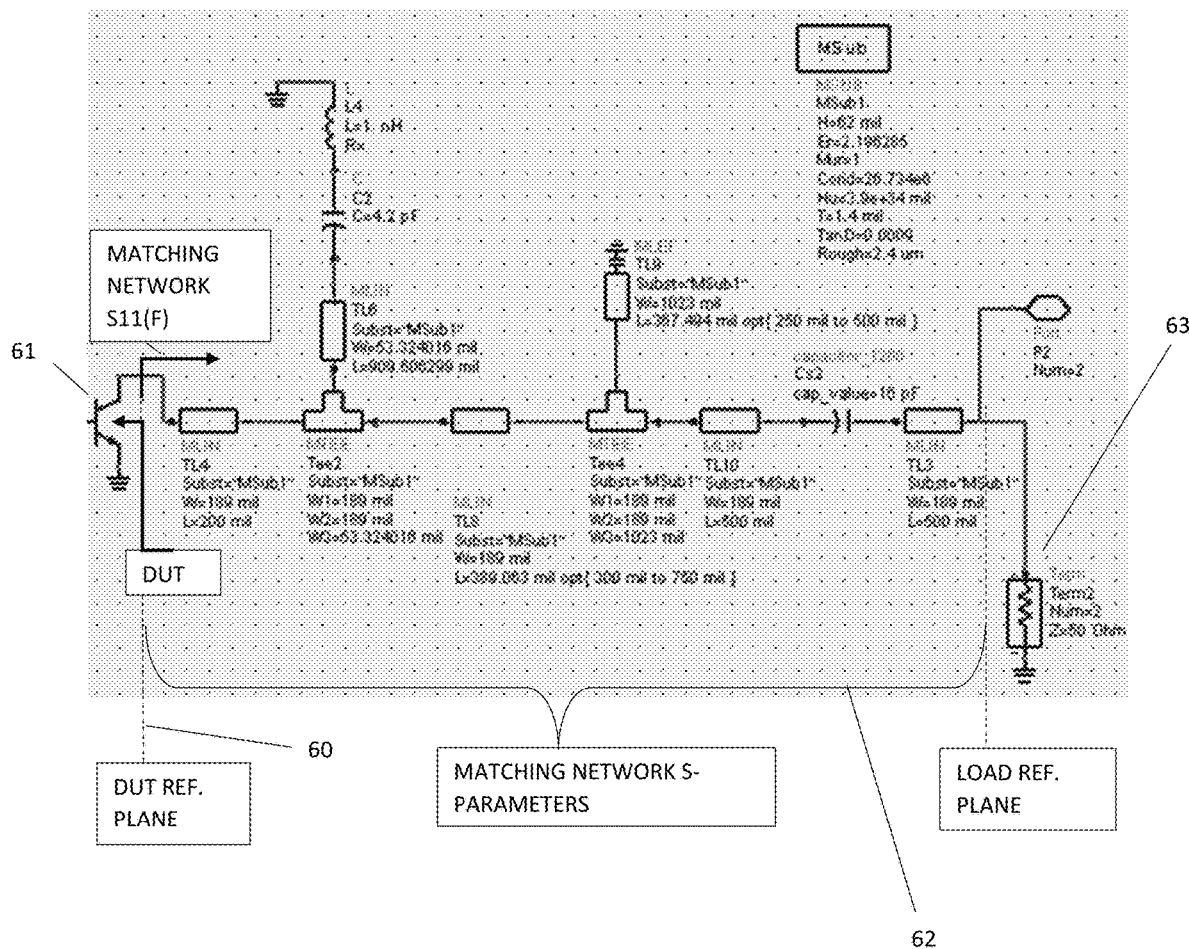
FIG. 6: Prior art

FIG. 7B: Prior art

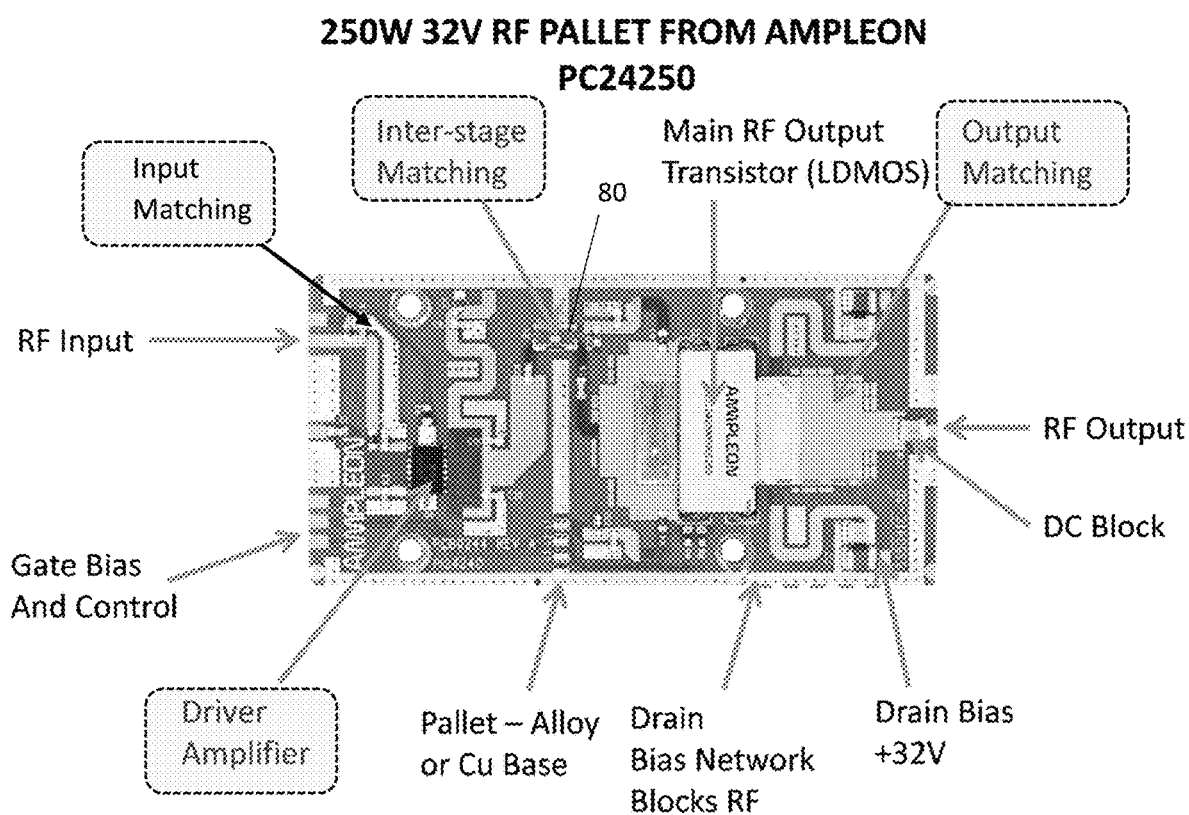
FIG. 8: Prior art

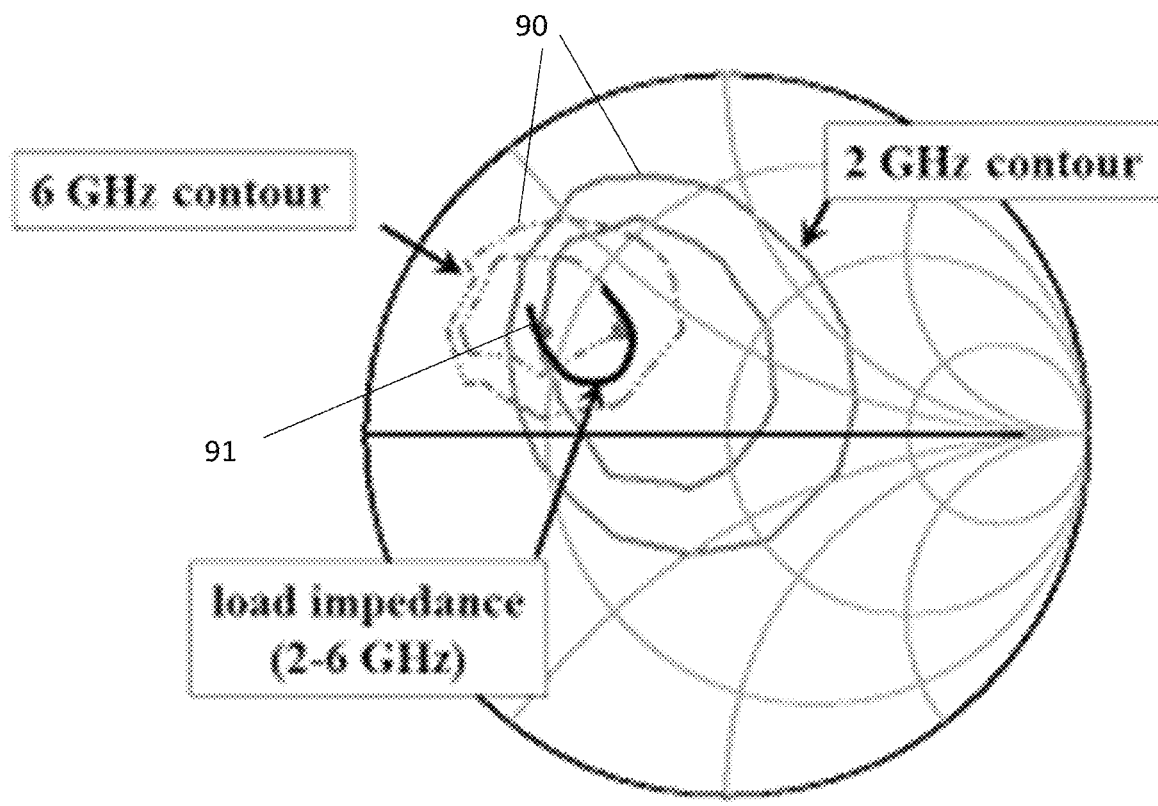
FIG. 9: Prior art

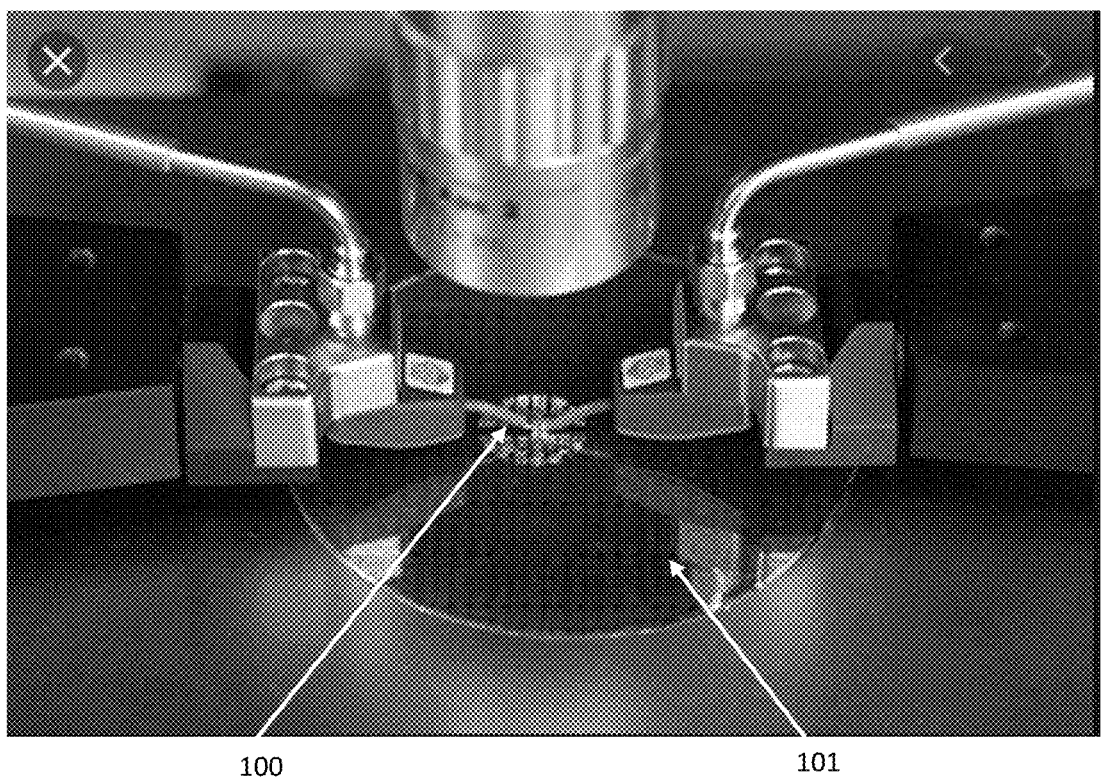
FIG. 10: Prior art

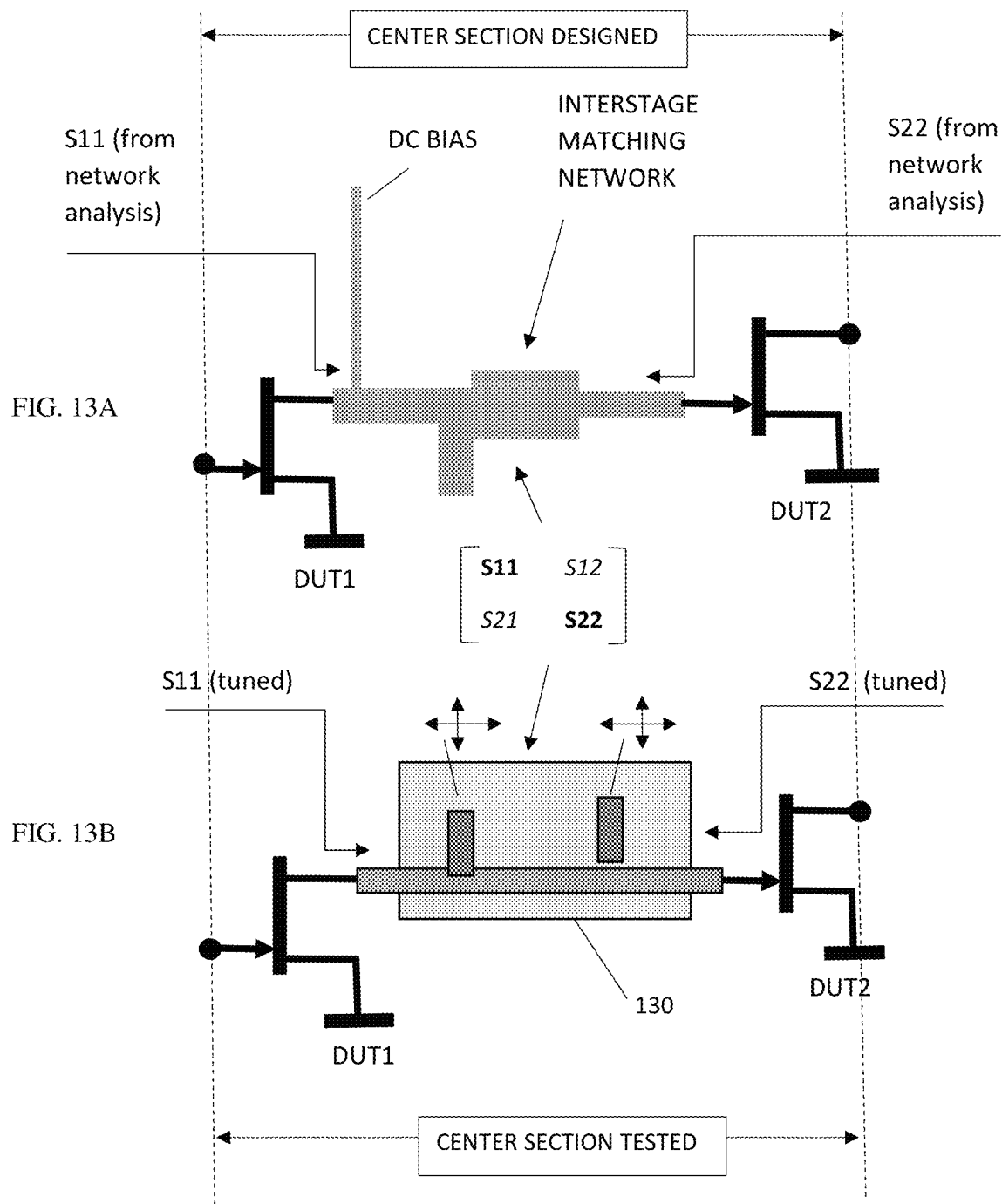

US 11,816,416 B1

EXPERIMENTAL VERIFICATION AND OPTIMIZATION OF TWO-STAGE AMPLIFIER

CROSS-REFERENCE TO RELATED ARTICLES

1. Load Pull, [online], Wikipedia [Retrieved on Nov. 18, 2016] Retrieved from Internet <URL:http://en.wikipedia.org/wiki/Load_pull>
2. "Computer Controlled Microwave Tuner-CCMT," Product Note 41, Focus Microwaves Inc., January 1998.
3. A New Load-pull Characterization Method for Microwave Power Transistors, Y. Takayama, [online], 1976 IEEE Microwave Theory & Techniques Society (MTT-S) International Microwave Symposium, pp. 218-220. [Retrieved on Jun. 04, 2017]. Retrieved from Internet <URL:http://ieeexplore.ieee.org/document/1123701/>
4. Focus Compact Modeling [online], Brochure, Focus Microwaves [Retrieved on Mar. 13, 2019], Retrieved from Internet <URL:https://focus microwaves.com/focus-compact-modelling/>.
5. "WinPADS, a Power Amplifier Design Software using Load Pull Contours", Product Note 56, Focus-Microwaves Inc. May 1999.
6. "Load Pull Measurements on Very low Impedance Transistors", Application Note 06, Focus Microwaves, Inc. November 1993.
7. "MPT, a universal Multi-Purpose Tuner", Product Note 79, Focus Microwaves Inc. October 2004.
8. Benedikt et al. U.S. Pat. No. 7,816,926, "High frequency circuit analyzer".
9. Marchetti et al. U.S. Pat. No. 8,456,175, "Open loop load pull arrangement with determination of injections signals".
10. Tsironis, C. U.S. Pat. No. 9,625,556, "Method for calibration and tuning with impedance tuners".
11. Tsironis, C. U.S. Pat. No. 8,497,689, "Method for reducing power requirements in active load pull system".
12. Tsironis, C. U.S. Pat. No. 6,674,293, "Adaptable pre-matched tuner and method".
13. "Transfer matrices", Princeton University, page 5, equations (1.13) and (1.14).
14. "EEsof EDA Advanced System Designs" Brochure 5988-3326EN, Keysight Technologies, July 2017.

BACKGROUND OF THE INVENTION

This invention relates to the design and optimization of RF embedding (matching) networks of multi-stage microwave active apparatuses, in particular two-stage power amplifiers. Transistor load pull data (i.e., transistor ISO contour characteristics under non-50 Ohm load conditions, 90 (FIG. 9)), used in power amplifier design, are generated either by (nonlinear) numerical transistor models (see ref. 4) or by load pull measurements (see ref. 1) resulting in the optimum impedance 91. Even though the term "model" is generally understood to have general validity among a certain species, in the case of microwave transistors (device under test, DUT) this is not true. Nonlinear transistor models are relatively accurate only in a very narrow space of transistor type and operation conditions (frequency range, DC bias conditions and operation power). Outside this space, data provided by "generic" nonlinear models being adequate for understanding and improving the transistor manufacturing process, are notoriously inaccurate and rather useless for practical amplifier design purposes. Even in that sense, i.e., inside the limited validity space, such models are still less accurate than actual load pull measurements, performed on specific transistor samples at specific frequencies, DC bias conditions and input power. Anything yielding results below approximately 1% accuracy is practically useless.

In particular, the design of two-stage amplifiers is problematic (see ref. 5), because the design of the interstage matching network 80 (FIG. 8), 70 (FIG. 7) and FIG. 13A is mostly guesswork. This matching network must transform the nonlinear, bias and frequency dependent, output reflection factor 71 (FIG. 7) of the first stage (DUT1) into the nonlinear input reflection factor 72 of the second stage (DUT2). Any change of input power into the amplifier affects the operation condition of the first and the second stage, possibly driving both into nonlinear gain compression and causing signal distortion. Managing this kind of dynamic operation requires lots of intuitive use of extensive data base in form of compression load pull contours (see ref. 5). Although the broad lines of the problematics have been analyzed in ref. 5, no practical design method or implementation has been known to date, possibly due to its complexity. As of today, no actual two-stage amplifier design can be verified experimentally before the actual amplifier has been laboriously, costly and time-consumingly manufactured.

DESCRIPTION OF PRIOR ART

Design of RF power amplifiers requires the transistors to be load-pull tested to allow a first approach. Traditional passive load pull systems (FIG. 1) include a signal source 1, which may include a driver amplifier (not shown) to boost the available signal power, an input impedance tuner 2, a DUT (i.e., a RF/microwave transistor) mounted in a test fixture 3, an output impedance tuner 4 and a microwave power sensor 5. The injected power is measured at a coupled port 6 at the input, and the output power at the power meter (sensor) 5. Additional components, such as bias tees, attenuators, filters and couplers, as well as instruments, such as DC power supplies and spectrum analyzers, are also used but do not change the basic concept. The DUT's characteristics are measured as a function of source and load impedances generated by the impedance tuners 2 and 4 at the operating (fundamental, Fo) frequency and a number of harmonic frequencies (2Fo, 3Fo . . . ), generated by the nonlinear DUT. The total is controlled by a system computer 11, which uses control links 7, 8 to the tuners 2, 4 and communication links 9, 12 with the instruments for configuring, triggering and data acquisition (see ref. 1).

Hitherto, interstage matching networks for 2-stage amplifiers 70, 80 (FIG. 7B, 8 and 13A) were designed in order to match the output reflection factor 71 of DUT1 (input stage) to the input reflection factor 72 of DUT2 (output stage), using nonlinear transistor models (see ref. 4) or load pull measurements (FIG. 9), to best meet user defined target performances. The input and output impedances (reflection factors) of transistors operating at the limit of, or inside the nonlinear regime, shift with changing input RF power and DC biasing of either transistor (DUT), as do their output power, gain and linearity. So, while the "to be matched" impedances 71 and 72 are dynamic and shift with operating conditions, the interstage 70 (as well as the input 73 and output 74) matching networks (FIG. 7A, 7B, 8) are fixed passive circuits, that do not change with the said operating conditions (RF or DC power). This already shows the complexity of the undertaking if it is done in independent consecutive steps and not "live".

The usual procedure for designing RF/microwave power amplifiers follows a number of steps: (a) the transistors are selected per promising data sheet; (b) the transistors are DC-IV mapped and RF load pull data are generated using pre-calibrated test setups (FIG. 1), or nonlinear transistor models (see ref. 4); (c) the load pull data are used to design the matching networks; (d) the amplifiers are manufactured and (e) tested. If the results are not according to target specs, the procedure goes back to steps (c) to (e). If the amplifier is medium to high power (5-10-Watt output power or more) the amplifiers are manufactured in microstrip technology (FIG. 5) for which the transistors to be tested are packaged and mounted in test fixtures (FIG. 3B and ref. 6); at lower power the transistors are chips, tested in situ using microprobes 100 on wafer 101 (FIG. 10).

This already proves the difficulty of designing for a range of input power yielding specific output power, gain, efficiency or linearity objectives. A load pull-generated data base, covering a reduced range of input power and bias conditions for each stage and for each frequency, reveals the size of the undertaking: 5 input powers, 5 DC bias points and 5 frequencies, per stage, taken as a minimum, would require 250 measurement sessions at roughly minutes each, resulting in close to 1 week's testing in addition to the system setup and the tuner and load pull test setup calibration time. Nonlinear models, on the other hand, while easily accessible and flexible, are not accurate enough and the slide screw load pull tuners (see ref. 2) cannot emulate impedance contours for modulated signals (see ref. 8, 9) either.

BRIEF SUMMARY OF THE INVENTION

In one sentence, the invention consists in combining existing technologies such as: 1. Impedance tuners for load pull measurements, 2. Computers for RF network synthesis and analysis and 3. Numerical optimization algorithms, to create a method for in-situ experimentally verifying and optimizing the effect of matching network designs on overall amplifier performance before their manufacturing. The method eliminates guesswork in amplifier design, especially with regards to the interstage matching network of two-stage RF amplifiers. When properly implemented, the method revolutionizes MMIC amplifier design, by augmenting design confidence and bypassing costly hardware iterations.

The method allows testing and optimizing a specifically embedded transistor's response, such as linearity and amplifying potential, also subject to modulated input signals, which means that the designed matching networks for modulated signals can be verified and optimized before any manufacturing. In view of present lengthy and costly "trial and error" "design-manufacturing-testing" iterations, whereby designs are first converted from electrical equivalent networks 62 (FIG. 6) to photolithographic masks for MIC (FIG. 10) or MMIC (see ref. 7), then manufactured and tested afterwards, this will be a breakthrough.

BRIEF DESCRIPTION OF THE DRAWINGS

The invention and its mode of operation will be more clearly understood from the following detailed description when read with the appended drawings in which:

FIG. 1 depicts prior art, a typical automated load-pull test setup using passive slide screw impedance tuners.

FIG. 2 depicts prior art, the distribution of s-parameter tunable calibration points of the reflection factors S11 or S22 on the Smith chart at either port of passive slide screw tuners.

FIG. 3A through 3B depict load pull test setup for two-stage amplifier: FIG. 3A depicts the test setup; FIG. 3B depicts prior art, the content of the DUT1 and DUT2 item in FIG. 3A, comprising the intrinsic INTR. DUT embedded in a test fixture.

FIG. 5 depicts prior art: typical MIC (microwave integrated circuit) of a single stage amplifier, including embedding and adjustable matching networks and transistor (DUT).

FIG. 6 depicts graphic network description of single stage amplifier compatible with network analysis software console.

FIG. 7A through 7B depict the equivalence between the two-stage amplifier test setup and a monolithic amplifier design: FIG. 7A depicts the load pull setup; FIG. 7B depicts prior art, a two stage MMIC amplifier layout.

FIG. 8 depicts prior art, a photograph of an actual commercially available MIC two-stage power amplifier.

FIG. 9 depicts prior art: load pull ISO contours and large signal load impedance of wideband (2-6GHz) power amplifier.

FIG. 10 depicts prior art: detail of on-wafer testing of a transistor chip using micro-probes.

FIG. 13A through 13B depict the emulation of the center section including the interstage matching network and two transistors, using a two-probe slide screw impedance tuner: FIG. 13A depicts a typical layout of an interstage matching network in microstrip technology; FIG. 13B depicts the emulating two-probe impedance tuner in place of the interstage matching network.

DETAILED DESCRIPTION OF THE INVENTION

Figure 4:
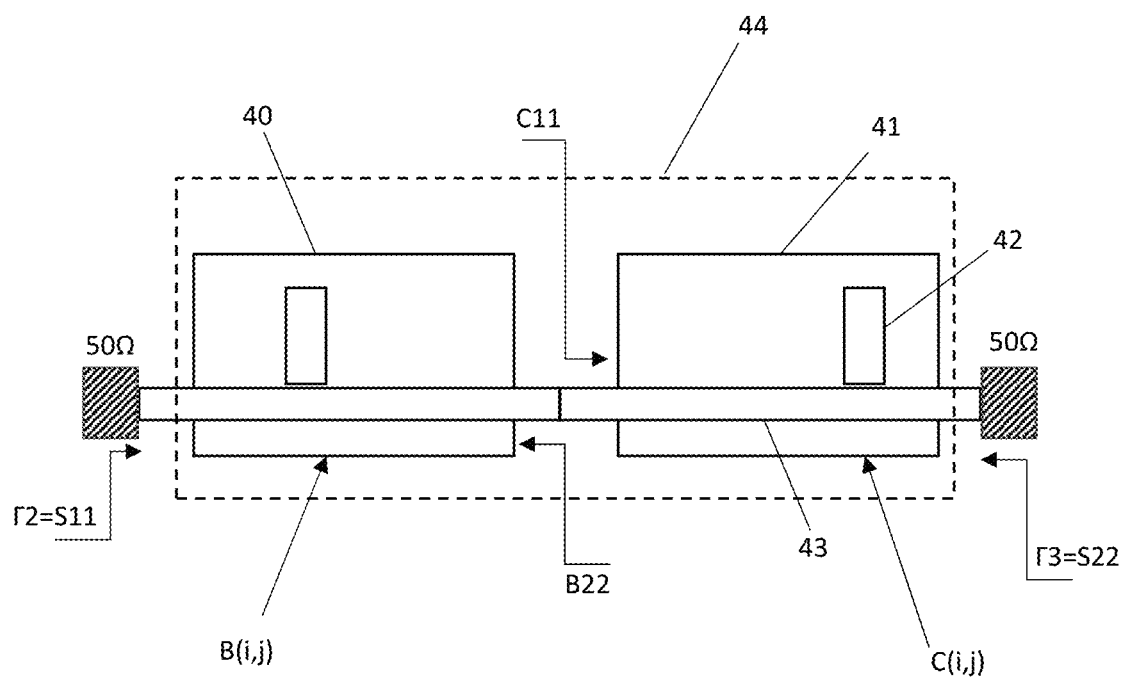
FIG. 4 depicts splitting a two-probe slide screw impedance tuner into a cascade of two single probe impedance tuners.

In this invention the two-stage amplifier is an "active integrated RF network", being a MIC (microwave (microstrip) integrated circuit, FIG. 8) or a MMIC (monolithic microwave integrated circuit, FIG. 7B), having two "active" semiconductor devices 75, 76 (transistors). The term "active" is not used in its strict meaning, i.e., meaning that the produced energy is higher than the injected energy. In that sense, rigorously speaking, there are no active devices in nature. What is commonly called "active" refers to energy transformers or processors, i.e., an amplifier is active because the output RF power can be higher than the input RF power, but if the DC supply energy is taken into account, then the total produced power is still smaller than the total consumed power. So, we use the term "active" referring only to RF power. The term "active tuner" (see ref. 11) is used to describe a tuning network, wherein the impedance presented to the DUT ports is not created exclusively by reflection on passive load (such as mechanical tuner) but is virtual, i.e., the returned signal is, at least partly, created by external synchronized source or by sampling, amplification and re-injection of the primary signal (see ref. 8).

However, the method in this invention is not a traditional load and source pull test method: Beyond an initial partial load pull session to start the optimization, load pull is not what happens here. What happens here is the real-time emulation and optimization of a complex, nonlinear amplifier design (FIG. 7B), without any previous attempt in manufacturing or nonlinear modeling anything, any hardware or other verifications; the method allows creating and optimizing, in real time, a virtual full active amplifier prototype for CW and wideband signals.

The procedure executes as follows: in a first step, in a frequency by frequency sequence, the calculated network parameters (typically scattering (s–) parameters) of the matching network structures 70, 73, 74 are exported into the tuners 77, 78, 79 or 35, 36, 38 of the load pull system, which synthesize, as close as possible, the reflection factors Γ1, Γ2, Γ3 and Γ4 (FIG. 3A) of the matching networks 70, 73, 74 presenting the reflection factors Γ1 to Γ4 at the input and output reference planes 60, 71, 72 and 33, 34 of the DUTs; then the load pull system measures and extracts, by de-embedding the s-parameters of the tuners 35 and 38 and the associated test setup components including segment 32 (TF-OUT) of the DUT1 housing test fixture TF#1 and segment 30 (TF-IN) of the DUT2 housing test fixture TF#2 (DUT is shown in FIG. 1, and DUT1 or DUT2 and associated test fixture segments 30 and 32 are shown in FIG. 3B), revealing the response of the center section 701 and FIG. 3A and 13A . The center section is critical for this operation: It is defined between reference planes 33 and 34, excluding the input section TF-IN of test fixture TF#1 and the output section TF-OUT of test fixture TF#2, of the two-stage amplifier, the intrinsic DUT1 and DUT2 and the interstage matching network 70, operating under the specific impedance conditions, in real time; DUT1 operates almost exactly at the same conditions as the future amplifier (same DC bias, input power, same source and similar load impedance), whereas DUT2 operates under similar source and the same load impedance, but may be receiving slightly different input power, depending on the difference between the loss of the interstage matching network 70 versus the loss of tuner 78. Then the calculated s-parameters of the matching networks 73 and 74 are embedded back (cascaded on both sides to the center section), creating, this way, a future virtual amplifier, of which we would know, in real time, with acceptable degree of accuracy, the expected performance. At this point the matching networks 70, 73 and 74 exist only numerically in the network analysis program, but the method allows the transistors (DUT1 and DUT2) to be tested "as if" they were integrated in the amplifier.

Figure 7A:
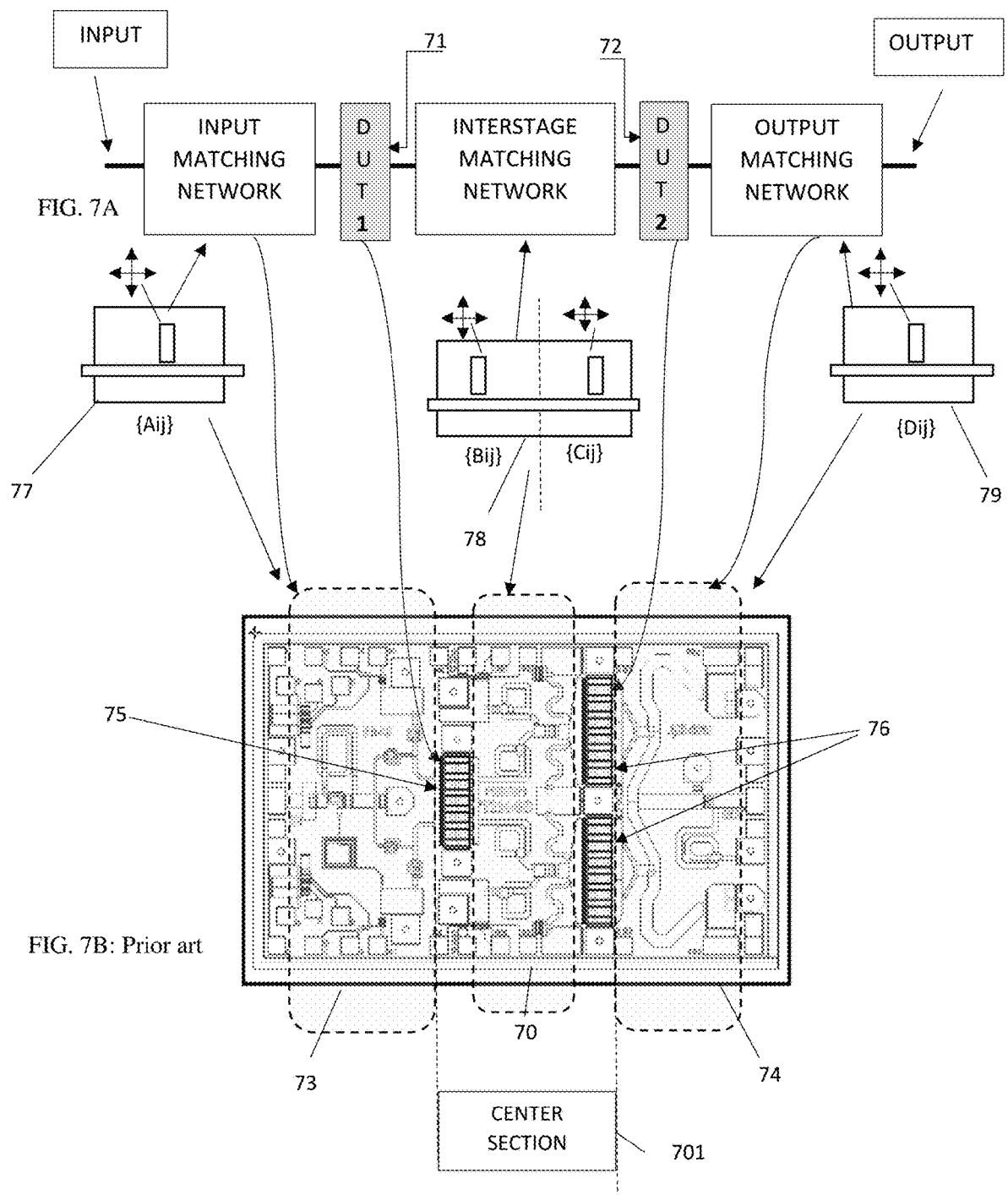

Embedding, De-embedding is a numeric method (FIG. 7) for shifting the reference planes 60, 71, 72, 33, 34 of a data set or correcting measurement data; in RF/microwaves, if the items to be processed are known in form of s-parameter matrices, this happens by cascading with the matrices of s-parameter data sets (embedding) or cascading with the invers matrices of s-parameter data sets (de-embedding). If the items are combinations of scalar and matrix data sets, where the phase of the signal is irrelevant, then the effective gain or loss of the em- or de-embedding network is considered. De-embedding the s-parameters of the test setup, items 6, 2, 4 (FIGS. 1) and 30, 32 (FIG. 3B) yields the performance of the naked (intrinsic) DUT 31, de-embedding the s-parameters of tuners 77 and 79 from the center section 701 and embedding the s-parameters of the matching networks 73, 74 to the center section 701 yields the expected performance of a "virtual" amplifier network to be manufactured (FIG. 7B). The s-parameters of the input section of test setup [S.IN] include all components from the signal source (or input power detector 6), the input tuner 2 and the input section of the test fixture 30 and the s-parameters of the output section [S.OUT] include the output section of the test fixture 32, the output tuner 4 until the power sensor 5. The systematic is analogous in the case of the two-stage amplifier, shown in FIG. 3A. In the specifics of this invention the matrix operations for each amplifier stage are as follows (all s-parameter matrices [S] are converted to transfer matrices [T], see ref. 13): Assuming the DUT ([DUT]:=[DUT.T]) is measured in a load pull test system having matrix [S.IN]:= [T.IN] connected to its input port and [S.OUT]:=[T.OUT] connected to its output port, and yielding measurement data [MEAS]:=[MEAS.T] data, then $[DUT.T]=[T.IN]^{-1}*[MEAS.T]*[T.OUT]^{-1}$ {eq.1}, and [DUT.T]=:[DUT], wherein ":=" signifies conversion from "S" to "T" matrix, and "=:" signifies conversion from "T" to "S" matrix. If the matching networks MN have s-parameter matrices [MN] and t-parameter matrices [MN.T], then the virtual amplifier [AMPL] will be: [AMPL.T]=[MN.T.IN]*[DUT.T]*[MN.T.OUT] {eq.2} yielding [AMPL.T]=: [AMPL] {eq.3}. Or overall: $[AMPL]=: [MN.T.IN]*[T.IN]^{-1}*[MEAS.T]*[T.OUT]^{-1}*[MN.T.OUT]$ {eq. 4}; This rule can be applied to the two-stage amplifier as well. In this case the S11 and S22 (FIG. 13A) of the interstage matching network are synthesized using tuner 130 or 37 and the overall performance of the center section (FIG. 13B) is measured and optimized "in situ". The difference between S12, S21 of the interstage matching network and the S12, S21 of the tuner 130, 37 may affect slightly the power transfer between stages, and this is the only un avoidable compromise.

The procedure for the two-stage amplifier executes as follows: After full tuner and setup calibration (see ref. 10), whereby s-parameters of all setup components and the tuners are saved in calibration files, the transistors (DUT1 and DUT2) are inserted in the test fixtures or probe stations and DC biased. Then initial matching networks MN1-MN3 are introduced into the network analysis software, based on sample designs and/or user experience. The s-parameters of the networks are calculated by the network analysis software and downloaded into the load pull software which drives the tuners to synthesize, as close as possible, the impedances Γ1 to Γ4 presented to the input and output ports of DUT1 and DUT2 (FIG. 3A). Then the signal power is injected making sure that its amplitude is corrected by the difference between the insertion loss of tuner 35 and the insertion loss of the input matching network MN1, in order for DUT1 to receive the same power it will receive when the amplifier is manufactured. Then the performance of the chain: "tuner 35-DUT1-tuner 36-DUT2-tuner 38" is measured in the load pull system; subsequently the s-parameters of tuners 35, 36 and 38 are replaced by the s-parameters of the matching networks MN1, MN2 and MN3 correspondingly using de- and embedding techniques as described in { eq. 1} providing real-time in-situ information of the two-stage amplifier to be manufactured.

The setup (including tuner) calibration procedure of the verification/optimization method is a family of prior art techniques (see ref. 6 and 10) of characterizing the components of the test setup (FIG. 1, 7A, 11) and their interconnections, normally known to a person skilled in the art.

In this procedure the only limitations are the precision at which the (calculated) s-parameters of the matching networks, especially the reflection factors presented to the DUT by the interstage matching network 70 (S11 to DUT1 and S22 to DUT2, FIG. 13A) can be emulated by the tuner 130 (FIG. 13B); on the other hand, s-parameters of the calibrated tuners are accurate within better than 1% and calculated s-parameters of passive matching networks as well. Or, we can expect an overall accuracy of the order of 1% in real time.

The proposed method uses the intrinsic data of the (naked, intrinsic) DUT (FIG. 3B) as a reference. Extracting measured data of the intrinsic DUT from overall measured load pull data requires calibrating all components of the load pull test setup (see ref. 6 and 10). This includes the test fixture or wafer probes, the tuners and any associated RF components as shown in FIG. 1. The calibration methodology is well established, both for the test setup and the test fixture (see ref. 6) and for the tuners (see In particular slide screw impedance tuners (see ref. 2 and 7) allow synthesizing any impedance (reflection factor Γ) on the Smith chart (FIG. 2). This means the input 35 and the output 38 tuners can emulate the reflection factors Γ1 and Γ4 (FIG. 3A) presented to the DUT1 and DUT2 by any passive matching network 73 or 74 (FIG. 7). This step is rather straight forward. The main difficulty appears when trying to emulate the interstage matching network 70. For that we use a at least two-probe tuner 36.

Figure 12:
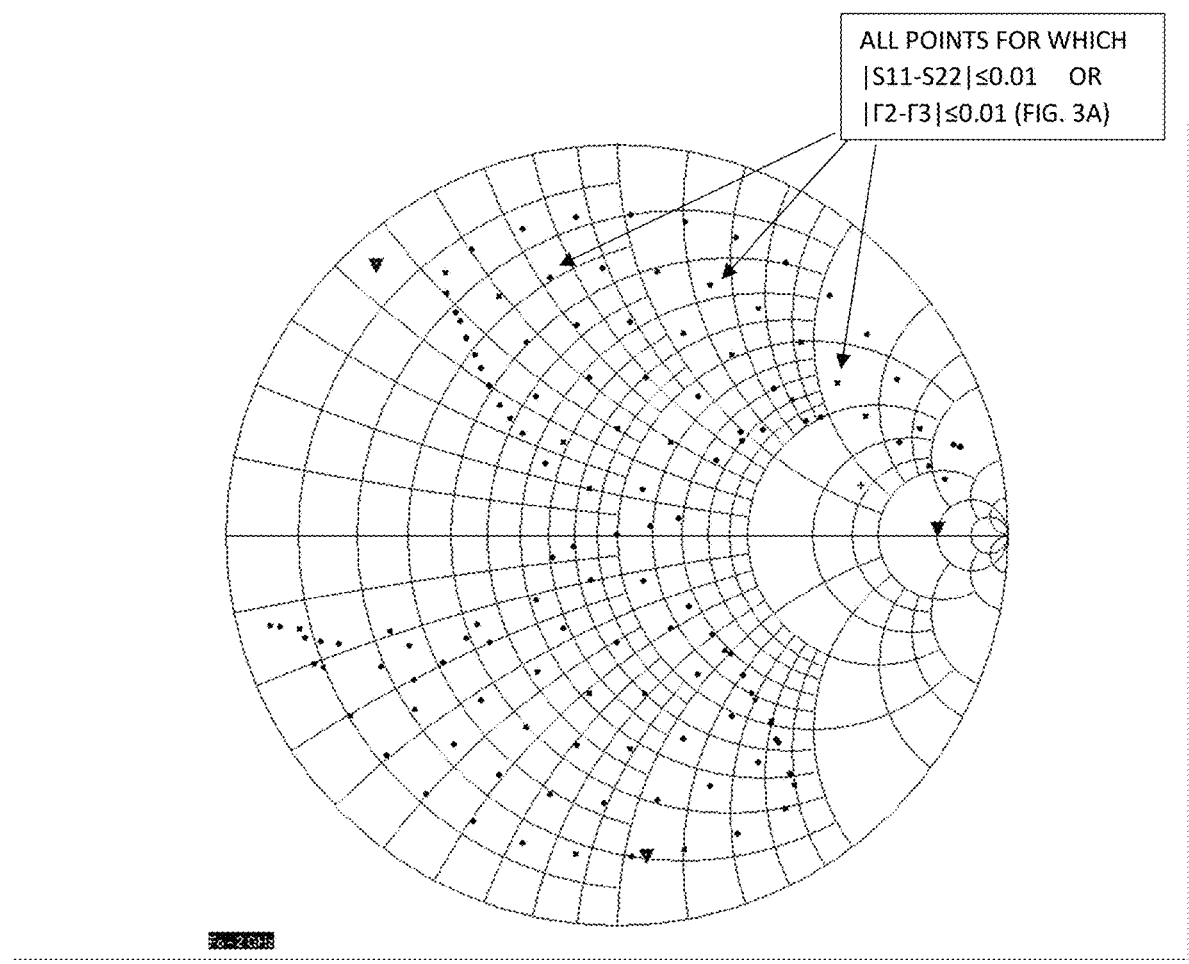
FIG. 12 depicts synthesis capability of two-probe slide screw tuner verified on being able to synthesize S11 and S22 simultaneously to obtain |S11-S22|≤0.01, (compare with FIG. 4).

The objective is to be able to synthesize simultaneously arbitrary reflection factors Γ2 and Γ3 at the input and output ports of tuner 38. This is not obvious, because any move of one probe affects the reflection created by the other probe. However, a simple logical approach shows, that it should be possible: Let us consider an arbitrary 37 separation line 302 splitting the tuner 38 in two cascaded tuners 40 and 41 (FIG. 4) as the virtual sections of the real two probe tuner 44, each having a slotted airline 43 and a freely movable and insertable reflection probe 42 (see). As in FIG. 2 the tunable points 20 on the Smith chart 21 show, tuner 41 can transform B22 to a desired Γ3 value and tuner 40 can transform C11 to a desired Γ2. The associated formula (for tuner 40 loaded with tuner 41 is):

$$\Gamma2 = B11 + (B12*B21*C11)/(1 - B22*C11) \quad \{eq. 5\}$$

and for tuner 41 loaded with tuner 40 it is:

$$\Gamma3 = C22 + (C12*C21*B22)/(1 - C11*B22) \quad \{eq. 6\},$$

wherein B(i,j) and C(i,j) are s-parameters. Since the separation line 302 in FIG. 3A is arbitrary, equations 5 and 6 are valid. FIG. 12 shows solutions of an equation created as an example, if we demand Γ2=Γ3 or 11+(B12*B21*C11)/(1−B22*C11)=C22+(C12*C21*B22)/(1−C11*B22) yielding: (B11−C22)*(1−C11*B22)=C12*C21*B22-B12*B21*C11 {eq. 7}. FIG. 12 shows that equation 7 does not have solutions everywhere on the Smith chart, because of the nature of the tuners, which behave, in fact, as transmission lines with interfering parallel capacitors. This means that any other combination of Γ2 and Γ3 will also suffer some limitations. The solutions to {eq. 7} in FIG. 12 have been found numerically using real data of a calibrated two-probe tuner as in ref. 12 and an acceptance criterion of |Γ2−Γ3|≤0.01.

Depending on the design targets set by the operator and the acceptance criteria (tolerances), the weighed difference between expected (target) and test results are used to calculate an error function and the network elements in the "design-test" loop are adjusted, exported to the tuners, tested, compared with the targets and the procedure is repeated until an acceptable compromise is found.

A possible alternative to passive slide screw tuners is presented by active systems (see ref. 8 and 9). In such load pull systems, the reflection factor is created by independent reverse signal injection into the output of the DUT coming not or not entirely through reflection on a passive tuner but through either an independent open loop synchronized external signal source or through a closed feedback loop (active load, see ref. 8). Such injected signal, if modulated, can have independently controlled amplitude and phase of the individual signal components and can be able to emulate arbitrary load matching network frequency patterns (see ref. 9).

It is improbable that a first iteration would yield acceptable results. An optimization procedure is necessary in which the values of the elements of matching networks are changed manually or automatically, or the layout of the matching networks is changed (FIG. 6), typically manually, in order to improve the expected user-defined amplifier performance between DUT 61 and load 63, such as power, gain, efficiency, linearity etc. The optimization procedure uses an Error Function EF which includes the sum of the deviations of the actual measurements from the target values over a given frequency band: EF=SUM(|P.MEASURED−P.TARGET|). In a manual (using an appropriate user console) or automatic loop, the values of the matching network components are changed to minimize the error function. Manual intervention may be necessary, because non-extremely sophisticated automatic searches with realistic value limitations, often result in un-natural component values.

Nodal network analysis is a numeric method allowing a computer program to read matching network description and values, such as shown in FIG. 6, and calculate a set of network parameters, typically in form of scattering (s−) parameters between input and output ports over a user-defined frequency range (see ref. 14). Passive components (transmission lines, capacitors and inductors, FIG. 7B, 8 and 13A) are known to the network analysis method either by known formulas, or in form of measure data base.

Because of the high accuracy of readily available data of passive components used in the matching networks, the generated "virtual" amplifier, being calculated based on real and accurate measured data of the active DUT and accurate passive component data, delivers instantaneously a highly credible prediction of an, in future, to manufacture amplifier, thus saving considerable cost and time of otherwise required MMIC manufacturing or in-situ tweaking MIC iterations.

Figure 11:
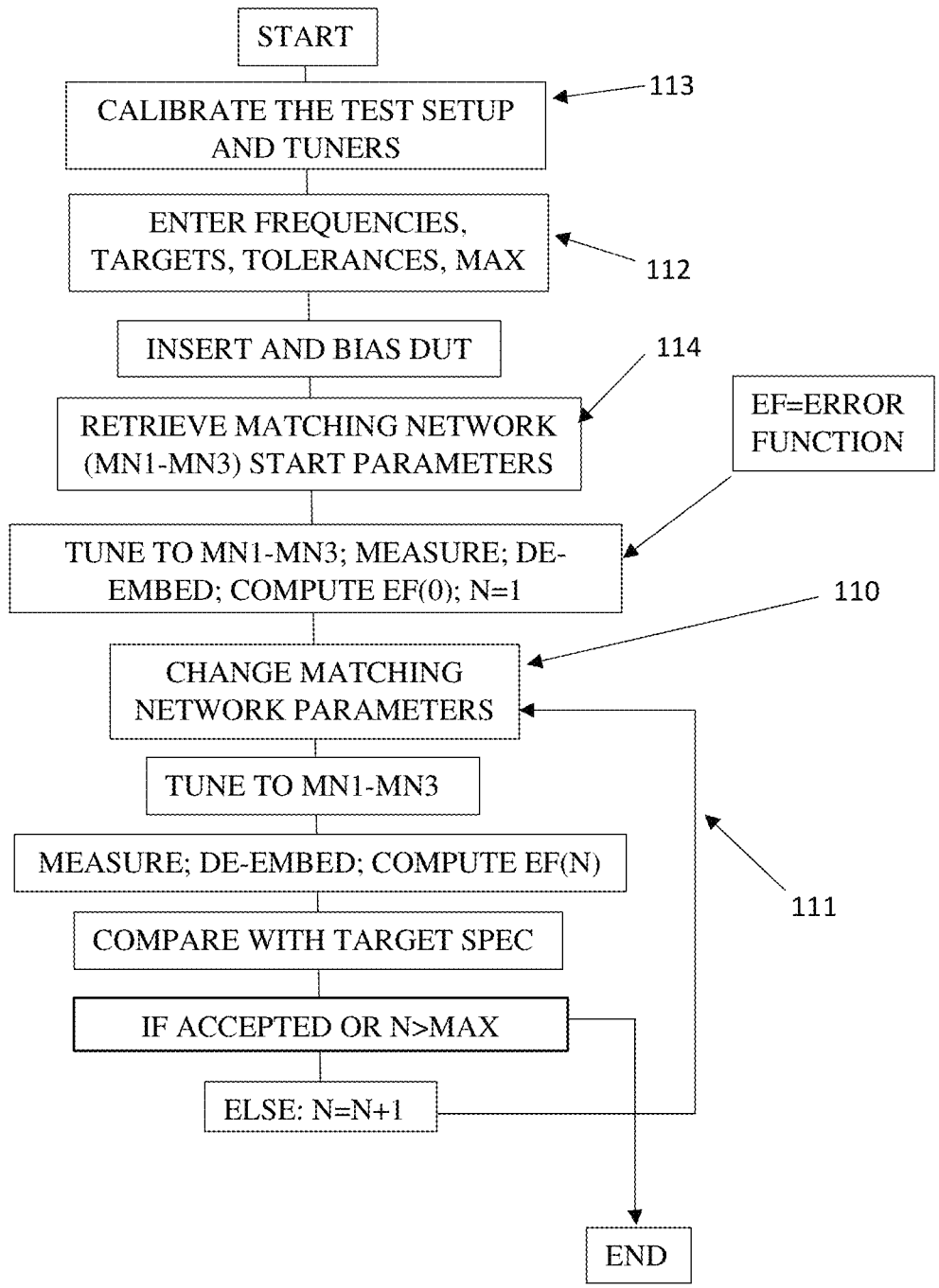
FIG. 11 depicts the flowchart of the experimental verification and optimization method of two-stage amplifier design.

The procedure executes as follows (FIG. 11): After the test setup, test fixture or wafer probe station, probes and passive or active tuner have been calibrated 113 at the center frequency and, step by frequency step, over the required frequency band, including a sufficient number of frequency steps to represent adequate information over the frequency and modulation bandwidth and operation parameters and targets 112 are defined, the DUT is inserted and biased. After that, manually or using network design tools, an appropriate network architecture is generated or imported 114. This can be done ad-hoc by experienced designers, or taken from typical samples, provided by the manufacturers of the design software tools. The network analysis software allows automated or manual adjustment of the value of each network component (FIG. 6); subsequently the calculated network parameters, typically in form of scattering (s−) parameters are imported into the tuner control software, which executes a "tuning-measuring" loop 111 consisting of tuning to the reflection factors of MN1 to MN3 presented to the DUT (Γ1 to Γ4) FIG. 3A, measuring and extracting the response of the center section including the input de-embedded DUT1 and the output de-embedded DUT2 and embed the s-parameters of MN1 and MN3, in order to determine, experimentally, the best overall amplifier performance according to the pre-defined design targets, by calculating the actual error function EF. During this procedure the RF behavior of DUT2 will change and may affect the overall performance of the amplifier "to be" made. The network parameters, in form of scattering (s−) parameters, are automatically generated by the network analysis/design tool. The error function is compared with the design targets and, if acceptable, the process terminates; if not, the network configuration or component size values are changed 110, manually or automatically, new network s-parameters Sij(F) are calculated and imported by the tuners, and the sequence of tuning, measurement, corrections and comparison with the target values, repeats 111 until satisfied, or until a pre-defined number of iterations is exceeded.

In a sense this method is an intelligent automation and upgrade of early times manual tweaking amplifier stages on Teflon-based Duroid™ substrate material microstrip structures (FIG. 5), by placing small metallic tuning discs (moly-tabs) or interconnecting the small metallic pads on the transmission lines using silver epoxy or bonding wires, and moving them, more or less blindly and more or less permanently, around, while observing the amplifier gain, output power etc. trying for the best empirical overall compromise. This "tweaking" method, is, of course, not only labor intensive and time consuming, it also lags flexibility, because it is restricted by the initial microstrip layout. However, with the network analysis software and the high-speed flexible tuning capacity of the tuners, these limitations disappear. Using the new method, a broad variation of network configurations can virtually be experimented with, for designing microwave and monolithic microwave integrated circuits MMIC (FIG. 7B), for which manual "tweaking" is physically impossible.

Every value of every component in the various matching networks can be experimented with virtually and rapidly. Matching networks (FIG. 7B and 8) include many adjustable components, as shown in these typical examples. Each non-lumped element (section of transmission line) can be adjusted in length and width (FIG. 13); lumped elements such as capacitors and inductors can only be adjusted in value. All together, dozens of combinations for each chosen network configuration can be experimented with. This, obviously, should not be done manually. The speed at which tuners can synthesize arbitrary networks, measure and calculate the overall amplifier performance, allows an extensive search for the optimum, both using gradient optimization methods but also random search strategies. The random search comprises arbitrary changes in parameters and moving forward when the overall Error Function improves. It has to be noticed that, perfect impedance matching is not necessarily the optimum overall condition. The matching networks have losses, which, for the same impedance pattern, depend on the choice of network configuration and the values of the tuning elements. This means that there is not a single solution to match a device. The user can and must experiment and find the best compromise for overall performance in short time, which the proposed method allows.

The new method allows overall real-time experimental optimization of compete active RF networks. The optimum amplifier performance is not associated exclusively with power matching the DUT to the load. This is only part of it. In a number of cases slight power mismatch improves other quantities, such as Power added Efficiency (PAE), Inter-modulation or ACP (adjacent channel power) and linearity in general at the price of lower output power. The loss of the matching networks interferes as well. A lossy matching network, which matches best the DUT will deliver less output power than a slightly mismatched network with lower insertion loss. All these complex considerations are automatically taken into account by the proposed overall experimental network optimization.

This invention discloses an experimental matching network optimization method for two-stage power amplifiers or other active RF networks subject to CW or modulated input signals. It uses slide screw passive, CW or modulated active tuners with network synthesis capacity and a network design and optimization software application both integrated into an iterative numerical design and RF testing load pull optimization loop.

What is claimed is:

1. An experimental verification and optimization method of the design of a two-stage RF amplifier at a multitude of frequencies Fi, with regards to a number of test parameters Pi, performed using a load pull test setup, comprises:
   a setup procedure,
   a network analysis algorithm,
   an optimization algorithm, and
   an execution procedure;
   wherein
      the two-stage RF amplifier comprises a cascade of two active devices (transistor, device under test, DUT) a DUT#1 and a DUT#2 and a matching network MN#1, inserted between a signal source and DUT#1, matching network MN#2 inserted between DUT#1 and DUT#2, and matching network MN#3 inserted between DUT#2 and a load, wherein each DUT and each matching network have an input port and an output port;
   and wherein
      the load pull test setup comprises at least:
      three impedance tuners T#1, T#2 and T#3, each having an input port and an output port, and
      two test fixtures TF#1 and TF#2 each having an input port and an output port, said test fixtures housing DUT#1 and DUT#2 correspondingly,
      wherein
         at least impedance tuner T#2 is a passive slide screw impedance tuner having at least two independently controlled tuning probes;

and wherein
tuner T#1 is inserted between the signal source and DUT#1, tuner T#2 is inserted between DUT#1 and DUT#2 and tuner T#3 is inserted between DUT#2 and the load.

2. The experimental verification and optimization method of the design of a two-stage RF amplifier of claim 1,
wherein
the setup procedure includes:
a) defining the multitude of test frequencies and calibrating the load pull test setup and the impedance tuners;
b) mounting and biasing DUT#1 and DUT#2;
c) entering the test parameters Pi, target values Pi.t, acceptance criteria and maximum number M of iterations;
d) entering matching network configurations, network components and starting values and setting an iteration index N to N=1.

3. The experimental verification and optimization method of the design of a two-stage RF amplifier of claim 1 or 2,
wherein
the network analysis algorithm includes:
a) importing the configuration and parameter values of the device matching networks MN#1, MN#2 and MN#3 from the setup procedure,
b) executing frequency domain analysis of the networks in step a) at frequency Fi, and
c) exporting network s-parameter data.

4. The experimental verification and optimization method of the design of a two-stage RF amplifier of claim 1 or 2 or 3,
wherein
the optimization algorithm has the capacity of:
a) performing the network analysis algorithm of MN#1 to MN#3 and retrieving s-parameter data;
b) tuning to the s-parameter reflection factors presented by the matching networks MN#1 to MN#3 to the DUTs, using tuners T#1, T#2 and T#3;
c) measuring values Pi.m of the test parameters Pi; set N=N+1;
d) de-embedding from Pi.m s-parameters of tuners T#1 and T#3 and embedding to Pi.m s-parameters of matching networks MN#1 and MN#3;
e) comparing the active two-stage RF network data of step d) with the target performance using an error function EF=SUM(|Pi.m-Pi.t|),
f) iterating by changing the matching network's MN#1 to MN#3 configuration and parameter values and executing steps a) to f), and
g) terminate if the acceptance criteria in step e) are met, or the number of iterations N>M.

5. The experimental verification and optimization method of the design of a two-stage RF amplifier of claim 1 or 2 or 3 or 4,
wherein the execution procedure follows the steps:
a) the setup procedure is executed and defines the frequencies, calibrates the setup and the tuners, defines the matching networks, the measurement parameters and the target objectives and prepares (inserts and biases) the DUTs;
b) the frequency is swept as in a) and the optimization algorithm is executed, yielding a best matching network configuration.

6. The two-stage RF amplifier of the experimental verification and optimization method of claim 1 having an input port and an output port, wherein
the input port of the two-stage RF amplifier is the input port of MN#1,
the output port of MN#1 is connected to the input port of DUT#1,
the output port of DUT#1 is connected to the input port of MN#2,
the output port of MN#2 is connected to the input port of DUT#2,
the output port of DUT#2 is connected to the input port of MN#3,
the output port of MN#3 is the output port of the two-stage RF amplifier.

7. The experimental verification and optimization method of the design of a two-stage RF amplifier of claim 1
wherein
the load pull test setup is configured as follows:
the signal source is connected to the input port of T#1,
the output port of T#1 is connected to the input port of TF#1,
the output port of TF#1 is connected to the input port of T#2,
the output port of T#2 is connected to the input port of TF#2,
the output port of TF#2 is connected to the input port of T#3,
the output port of T#3 is connected to the load.

8. The experimental verification and optimization method of the design of a two-stage RF amplifier of claim 1
wherein
each test fixture, TF#1 and TF#2, comprises an input section and an output section, and wherein
DUT#1 is inserted between the input and output sections of TF#1, and DUT#2 is inserted between the input and output sections of TF#2.

9. The experimental verification and optimization method of the design of a two-stage RF amplifier network of claim 1,
wherein
at least impedance tuner T#3 is an active impedance tuner capable of independently changing amplitude and phase of frequency components of a modulated signal.

10. The experimental verification and optimization method of the design of a two-stage RF amplifier network of claim 1,
wherein
at least impedance tuner T#3 is an active impedance tuner capable of creating reflection factor Γ up to at least |Γ|=1 at the output reference plane of DUT#2.

11. The experimental verification and optimization method of the design of a two-stage RF amplifier network of claim 1,
wherein
impedance tuners T#1, T#2 and T#3 are passive slide screw impedance tuners.

12. The experimental verification and optimization method of the design of a two-stage RF amplifier network of claim 3,
wherein
the network analysis algorithm comprises:
a user interface (console) for manual network configuration, parameter value control and DUT#1 and DUT#2 biasing adjustment.

13. The experimental verification and optimization method of the design of a two-stage RF amplifier network of claim 1,
wherein
at least one impedance tuner is a harmonic impedance tuner, capable of independently controlling impedances at harmonic frequencies of a fundamental test frequency.

* * * * *